Aug. 29, 1961 G. A. TINNERMAN 2,997,910
PLASTIC RIVET AND WEDGING PIN MOLDED THEREIN
Filed Jan. 13, 1958 2 Sheets-Sheet 1

INVENTOR
GEORGE A. TINNERMAN
BY- *Fetherstonhaugh & Co.*
ATT'YS

Aug. 29, 1961         G. A. TINNERMAN          2,997,910

PLASTIC RIVET AND WEDGING PIN MOLDED THEREIN

Filed Jan. 13, 1958                        2 Sheets-Sheet 2

INVENTOR
GEORGE A. TINNERMAN
BY Featherstonhaugh + Co.
ATT'YS

United States Patent Office 2,997,910
Patented Aug. 29, 1961

2,997,910
PLASTIC RIVET AND WEDGING PIN MOLDED THEREIN
George A. Tinnerman, 17864 Beach Road, Lakewood 7, Ohio
Filed Jan. 13, 1958, Ser. No. 708,576
1 Claim. (Cl. 85—40)

This invention relates to wedging or expandable fasteners of the kind particularly adapted for blind locations.

Fasteners of the general kind with which this invention is concerned have previously been made, preferably from plastic material having a head and depending spaced apart legs, together with an expanding member of the same material, carried by the head and which may be driven into the space between the legs to expand the latter when the fastener is located in an orifice. The legs are given an outer flared formation so that when the fastener is caused to wedge by the expanding member, the flared portion of the legs will, as the legs spread, engage the inner edge of the opening firmly to secure the fastener in the metal sheet or the like to which it is applied. Such fasteners are useful as a means for attaching shelves to the interior of refrigerators, may be employed to seal off moisture leakage to the interior insulated portion, and avoid destruction of the insulating qualities thereof. They are useful in various other capacities such as in radio chassis, having insulating value in respect of metallic structures carrying current, and may be found desirable to insulate that part from the chassis, and are useful in many other applications.

Outward flaring of the fastener of the kind indicated is necessarily controlled within limits by the ability of the fastener to collapse as it is ejected from the mold and its capability of spreading is limited by the diameter of the plastic pin used to expand the legs of the fastener beyond the diameter of the orifice through which it is projected for fastening purposes. Accordingly very close tolerance results between the minimum and maximum diameters of orifices through which the fastener may be projected for fastening purposes. Moreover, since the pin for expanding the fastener is of the same material as the fastener, such combination must be restricted to semli-rigid plastics in order that the pin is capable of taking the percussive drive to wedge the legs of the fastener apart. Consequently it will not be usually possible to employ the fastener as a sealing member as might be desired in many instances. The present invention avoids disadvantages of this prior type of fastener while providing a fastener which will operate according to a similar principle.

The invention generally comprises a wedging or expandable fastener having a body of formable preferably plastic material of yieldable character including an orificed head and a plurality of integral legs depending therefrom in spaced apart relation to form a channel therebetween disposed in registry with the orifice in the head, and a pin of harder material (preferably metallic) disposed in the orifice of the head having one end thereof freely projecting from the latter, the opposite end having an enlarged spreader portion disposed between the spaced apart legs and partially embedded therein whereby to cause said legs to spread apart in a wedging action when the free end of said pin is driven to cause said pin to move inwardly through said orifice.

The invention will be clearly understood by reference to the following detailed specification taken in conjunction with the accompanying drawings.

Figure 1:
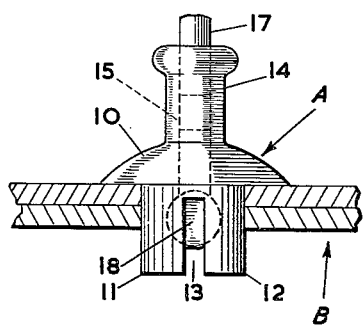
FIG. 1 is a side elevation of the wedging fastener according to the present invention shown disposed in an orifice formed between two sheets of material the latter being shown fragmentarily in section.

Referring to the drawings, A indicates a wedging fastener according to the present invention which in the illustration of FIG. 1 is located for the purpose of securing two sheets of material together which are generally indicated by the letter B. The fastener is generally formed with a body of plastic material having a head 10 from which a plurality of integrally connected legs 11 and 12 project spaced apart from one another by a dividing channel 13. The head may incorporate a projecting shank 14, if desired, and is formed with a centrally located passage 15 and which in a case incorporating a shank 14 would extend through said shank as shown. The expanding element or pin 17 is preferably made of a hard material such as from a suitable metal and is flattened or otherwise enlarged as at 18 at one end thereof to provide a spreader portion of substantial width and of narrow depth. The pins may be formed from a continuous length of metal or the like so flattened or extended at uniformly spaced apart intervals and reduced in diameter or pinched as at 19 adjacent the enlarged portion so that an individual pin is readily broken from the continuous multiple pin body from which the pins are formed.

Figure 3:
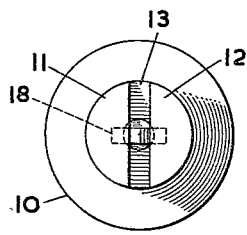
FIG. 3 is a top plan view of the fastener shown in FIGS. 1 and 2.
Figure 5:
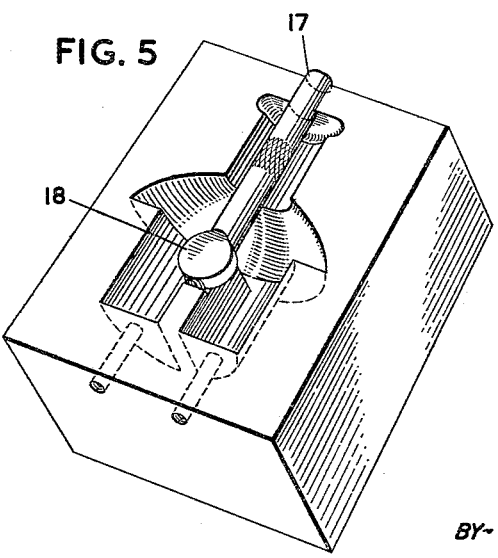
FIG. 5 is a perspective view of part of the mold which may be employed for forming fasteners of this kind.

The spreader portion 18 of the pin is preferably rounded or otherwise formed to give it a rounded or tapered narrow leading edge 20. Moreover, due to its substantial width and narrow depth, very effective spreading action will result with a minimum of resistance to the axial projection of the pin. In this instance it will be noted that the spreader 18 is partially embedded in each leg 11 and 12 of the fastener. This, of course, may be achieved in forming the fastener in a suitable mold, half of which is shown in FIG. 5, and wherein the pin 17 is supported in the mold cavity in a position so that when the plastic material is introduced the spreader will become embedded as shown in FIGS. 1 and 3.

Figure 2:
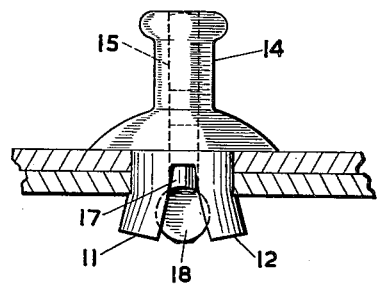
FIG. 2 is a similar view to FIG. 1 but showing the expanding pin moved into operative position to expand the legs of the fastener in wedge fastening position.

It is obvious from a consideration of FIG. 2 that when the pin 17 is tapped, it is caused to more inwardly in the passage 15 and the embedded spreader 18 will have the effect of forcing the legs 11 and 12 apart into a firm wedging position. Moreover, it will be appreciated further that by increasing the size of the spreader 18, the wedging action can be increased. Accordingly the degree of tolerance between the orifice receiving the fastener and the combined width of the legs of the fastener may vary to some reasonable extent. Moreover, since the wedging pin 17 is of a harder and different material from that of the fastener body, it is evident that the body may be made of a softer plastic where desired than that possible with a fastener of the prior art having a pin of the same material as the body so that this fastener may be adapted to a sealing function as well, depending upon the character of the plastic employed for its construction. The fastener material, such as polyhexamethylene adipamide, polystyrene formulation, or other practical material may be employed. Of course, it will be clear that in respect of a fastener having more than a pair of spaced apart legs such as 11 and 12, the spreader head 18 may take a somewhat bulbous form such that it will function to spread all of the plurality of legs in the manner such as above described.

Figure 4:
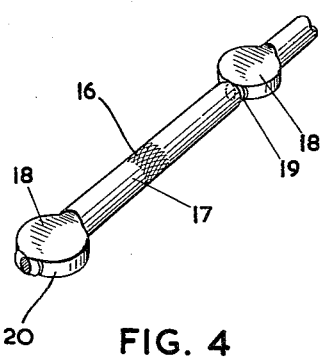
FIG. 4 is a fragmentary perspective illustration of the manner in which the wedging pins are preferably formed.

While friction between the wedging pins 17 and the body of the fastener will normally prevent the pin from moving axially beyond its position when tapped to spread the legs of the fastener, as shown in FIG. 2, it may be desirable to provide means for retaining or locking the pin in its tapped or projecting position. This may be done by knurling the pin intermediate its ends as at 16 (see FIG. 4). Alternatively, a positive locking of the pin in its projected position may be provided for. In this instance, reference is made to FIGS. 6 to 10.

Figure 6:
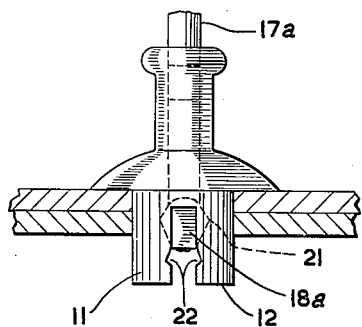
FIG. 6 is a fragmentary, partly sectional view of a mounting showing a wedging fastener of alternative construction associated therewith.
Figure 7:
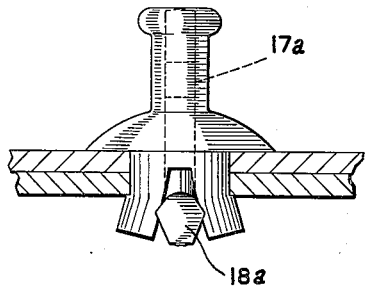
FIG. 7 is a view similar to FIG. 6 showing the expanding pin moved into operative position to expand the legs of the fastener in wedging fastening position with the expanding pin retained against further axial movement.
Figure 8:
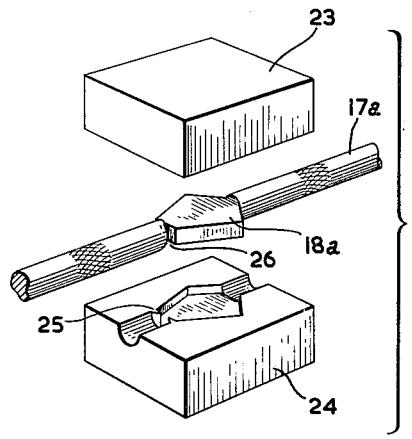
FIG. 8 is a perspective partly fragmentary exploded view of a die for forming the enlargment on the expanding pin and illustrating fragmentarily a formed pin.

Referring first of all to FIGS. 6 and 7, the pin 17a is formed with a spreader pin 18a of flaring angular character having the opposed projecting shoulders or points 21. To cooperate, the inner surfaces of the legs 11 and 12 are notched as at 22 so that when the pin is tapped to wedge the fastener in its mounted position, as shown in FIG. 7, the elements 21 of spreader 18a will lodge in the notches 22, thus preventing the pin 17a from axial movement after the wedging function has been accomplished. The pin 17a may be formed as in the case of pin 17 in a substantial intermittently continuous operation from a single length of wire by causing the latter, as shown in FIG. 8, to be fed between movable die parts 23 and 24 formed complementary to one another whereby to produce the spreader portion 18a and to provide, such as by the knife edges 25, the nicked or pinched portion 26 at the end of spreader member 18a so that an individual pin is readily broken from the continuous multiple pin body.

Figure 9:
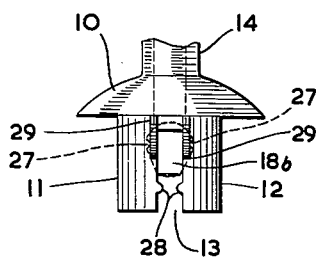
FIG. 9 is a fragmentary front elevation of an alternative construction of wedging fastener.
Figure 10:
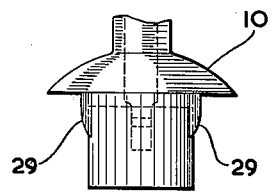
FIG. 10 is a side elevation of FIG. 9.

An alternative form of locking means is illustrated in FIG. 9 wherein the spreader portion 18b, of somewhat similar shape to that shown in 18a in the previous figures, is formed with small notches 27 in opposed sides thereof. These notches are designed to cooperate in locking function with the projecting bosses 28 formed on the inside faces of the legs 11 and 12 such that when the pin is tapped or projected from normal position to cause spreading of the legs 11 and 12, the notches 27 will be engaged by the bosses 28 whereby to lock the pin from any further axial movement.

Finally, it is preferred to form the legs adjacent the passage 13 and adjacent to the base of the head 10 with slight enlargements in the form of ribs 29 to form a means engageable with the edges of an orifice for preliminarily retaining the fastener in position. The ribs 29 will engage the edges of an orifice of a mounting member in frictional pressure engagement and obviate any necessity for the operator to hold the fastener should it tend to be slightly loose or will avoid dislodgment of the fastener once it is disposed in position in the orifice, thus leaving the workman completely free to achieve the fastening in a simple unimpeded operation.

It is obvious that the fastener in any of the forms it may take is simple in character and is adapted to perform its function in a very simple manner. It will also be obvious that by reason of its construction and the absence of tapered surfaces and a varying diameter in body as in fasteners previously produced, there are no difficulties in molding thereof or in respect of its removal from the mold. Consequently, it provides advantages over the prior art.

The embodiments of the invention in which an exclusive property or privilege is claimed are defined as follows:

A wedging fastener for insertion within an aperture of a mounting member comprising a molded body of organic plastic material having an enlarged head forming a shoulder surface to bear against said mounting member, a pair of straight integral legs depending from said head normal to said shoulder surface and in spaced apart parallel relation to one another forming a channel therebetween, extending from the free ends of said legs substantially to said shoulder surface, an axially drivable pin of harder material, centrally molded in said body and forming a passage in said head disposed in registry with said channel, said pin having an outer end located to project from said head and an inner end formed with an enlarged, flat, spreader head, of narrow depth, spanning said channel and having its flat surfaces disposed normal to said channel and its opposed narrow side edges molded in said legs and forming narrow receiving recesses therein, said flat spreaded head gradually increasing in transverse width in a direction axially inward from its inner end to a point of maximum extent within said legs to provide a narrow wedging surface along each of its side edges, said flat spreader head being located in spaced relation to said shoulder surface of said body as to dispose said flat spreader head within and projecting beyond said aperture in the mounting member when said shoulder is engaged with the latter, whereby when said pin is axially driven the wedging surfaces along the side edges of its flat spreader head will cause said legs to bend outwardly away from one another, in a direction normal to the channel therebetween, to grip opposed inner faces of the aperture in said mounting member.

References Cited in the file of this patent

UNITED STATES PATENTS

| | | |
|---|---|---|
| 583,309 | McLaughlin | May 25, 1897 |
| 1,169,693 | Swedlund | Jan. 25, 1916 |
| 1,234,487 | Raeger | July 24, 1917 |
| 2,542,144 | Kearns | Feb. 20, 1951 |
| 2,808,843 | McTaggart | Oct. 8, 1957 |
| 2,843,861 | Gandy | July 22, 1958 |
| 2,849,201 | Schelgunov | Aug. 26, 1958 |

FOREIGN PATENTS

| | | |
|---|---|---|
| 17,525 | Great Britain | 1907 |
| 11,620 | Great Britain | May 10, 1910 |
| 805,194 | Germany | May 10, 1951 |
| 1,136,639 | France | May 16, 1957 |